United States Patent Office 3,436,240
Patented Apr. 1, 1969

3,436,240
PROCESS FOR MAKING HIGH VOLATILE
CARBON BLACKS
Joe Young Rogers, Jr., and William H. Lewis, Pampa,
Tex., assignors to Cabot Corporation, Boston, Mass., a
corporation of Delaware
No Drawing. Filed Dec. 28, 1965, Ser. No. 517,089
Int. Cl. C09c 1/48; C01b 31/00
U.S. Cl. 106—307                                    4 Claims

ABSTRACT OF THE DISCLOSURE

Process for increasing the volatile content of carbon black wherein the carbon black is first oxidized with molecular oxygen to a volatile content of about 7 to 13% by weight and further oxidized with vaporized nitric acid or nitric oxide vapors at a temperature between 400° F. and 600° F.

---

This invention relates to improvements in processes for treating carbon black whereby certain selected characteristics may be imparted to the black in accordance with the use for which it is intended. The invention includes within its scope new and improved carbon blacks of substantial volatile content, a unique method for producing same, in addition to unique apparatus useful in the process.

Volatile content of typical commercial carbon black comprises a variety of substances on the surface of the black which substances affect the surface characteristics thereof. For example, volatiles of a carbon black having a volatile content of 4.49% were analyzed as follows:

|                  | Weight, percent |
|------------------|-----------------|
| Carbon dioxide   | 1.178           |
| Illuminants      | 0.030           |
| Oxygen           | 0.071           |
| Carbon monoxide  | 2.805           |
| Hydrogen         | 0.084           |
| Ethane           | 0.002           |
| Methane          | 0.048           |
| Nitrogen         | 0.274           |
|                  | 4.493           |

This analysis appeared in "Industrial and Engineering Chemistry" for September 1928 in an article entitled, "Carbon Black—A Study of Its Volatile Constituents."

Heretofore, carbon black having a volatile content as high as 20% has been produced by heating to moderately high temperatures while admitting a controlled amount of air thereto as suggested in reissued Patent No. 19,664 to Damon. In carrying out that process, however, there generally occurs a serious loss of carbon black by combustion, that is to say, a substantial proportion of the treated material is destroyed during the process of increasing the volatile content of the black.

Other improved processes are known in the art wherein carbon black is subjected to nitric acid treatment at temperatures below 400° F. and preferably below 300° F. As disclosed in U.S. Patent 2,420,810 issued to Bray et al., higher temperatures could not be successfully utilized in such processes because the surface area of the black would be undesirably increased and the product yield of the black would be undesirably decreased.

Thus, unless considerable care is taken in carrying out such prior art processes, large increases in surface area will be realized and the treated carbon black will develop surface characteristics which make it objectionably thixotropic when subsequently mixed with various commercial compounding liquids. Inasmuch as such treated carbon blacks are chiefly used in lacquer, ink and paint systems, this tendency toward thixotropy must be avoided.

Another problem which has been a drawback to the practice of prior art processes is the high capital cost of equipment required for carrying out the processes. For example, at temperatures of about 300° F. and below, nitric acid and nitrogen oxide vapors have a substantial corroding effect on mild steel. Thus, very expensive apparatus constructed of stainless steels, or other costly metals must be used in the prior art processes; otherwise, a rapid corrosion or frequent replacement of the equipment in which the process is carried out must be accepted as an integral part of the process economics.

Furthermore, whereas the above-cited Bray et al. patent described a process wherein carbon blacks were produced which had little or no tendency to long-flow characteristics, the process of the invention is ideally suited for the production of long-flow channel blacks such as those having an 11–15% volatile content.

Still another problem encountered in prior art processes utilizing nitric acid treatment was the relatively large amount of residual acid present on the surface of the carbon blacks produced by such a process. On storage, these high-acid carbon blacks often burned, i.e., the acid would react with paper bags in which the black was stored resulting in combustion. The instant application describes a process which substantially eliminates the problem of residual high acid content.

Therefore, it is an object of the invention to provide a process for increasing the volatile content of carbon blacks which process affords means for producing, at high rates, a carbon black having good flow properties and a very low residual acid content.

It is also an object of the invention to provide apparatus wherein the volatile content of carbon black can be produced at high temperatures with a highly efficient use of heat energy.

Other objects of the invention are in part obvious and in part disclosed hereinbelow.

The process of the invention is a method of adding volatiles to carbon black, preferably channel blacks, which comprises, in addition to a shortened oxygen-type treatment similar to the type previously known to the art, a final treatment with nitric acid for a period of about 1 hour at temperatures from 300 to 600° F. with a major portion of the hour being spent at temperatures from 400 to 600° F. This process as carried out greatly increases the productivity of the volatile-addition treatment and simultaneously provides a black having a surprising improvement in quality as measured by tinting strength and ink drying characteristics. Furthermore, contrary to the expectation derived from the teachings of the prior art, applicants' novel process operating for substantial periods of time at temperatures well above 400° F. provides a carbon black having advantageous surface characteristics as evidenced by lower drying oil absorption than similar blacks prepared by the processes and various other criteria.

The carbon blacks advantageous for use in the process are channel blacks. Most advantageously, high color channel blacks are subjected to a conventional oxygen-type pretreatment until their volatile content is about from 7 to about 13%. A typical process by which this initial pretreatment is obtained is disclosed more fully in a copending and commonly owned application Ser. No. 481,542, filed Aug. 23, 1965, by William H. Lewis and Joe Y. Rogers. During a second step of the instant process, the volatile content is usually increased to from about 12 to about 18%. This increase can be controlled by the quantity of $HNO_3$ being charged to the black carried in the screw conveyors.

Another particularly surprising advantage of the instant invention is the very nearly complete absence of any $NO_2$ fumes discharging from the acid treating apparatus. This advantage derived from such extraordinary efficiency of the process in utilizing nitric acid is important not only because it eliminates a serious and annoying air pollution problem in the plant area but also because it markedly reduces the corrosion in ducting associated with the processing apparatus.

In a particularly advantageous embodiment of the invention, heat from a hot house is utilized to heat carbon black as it is treated with nitric acid vapors. This novel arrangement of apparatus is made possible by several of the aforementioned advantages of the instant process and provides means to achieve excellent energy economy in the processing plant.

In the specification is described an illustrative embodiment of the invention; modifications thereof are also indicated, but it is to be understood that these modifications are not intended to be exhaustive nor limiting of the invention, but on the contrary are given for the purposes of illustration in order that others skilled in the art may fully understand the invention and manner of applying it in practical applications.

A conveyor trough having a screw conveyor element therein is normally sufficient to provide sufficient agitation for the process. Concentrated nitric acid (59%) is conveniently carried to the conveyor trough through a titanium pipe and sprayed therefrom onto the carbon black. Dwell time in the heated screw conveyor is advantageously about 1 hour during which time the carbon black is carried through about 180 feet of conveyor.

It is often desirable to construct the first section of the conveyor, i.e., where the nitric acid may come in contact with the conveyor at temperatures below about 300° F. or in an aqueous medium, of stainless steel.

About 800 pounds of carbon black is fed into the conveyor element during this hour and from about 0.3 to 0.8 gallons/hour of the concentrated nitric acid is injected into the screw conveying system. Carbon black at the outlet normally has a volatile content of approximately 11% to 18%. Of course all of these figures may be varied depending upon the properties desired for the carbon black.

The acid number of the carbon black so treated is normally below 0.03.

The instant process enables an increase approximately 130% in production over the processes heretofore used, i.e., those processes utilizing temperatures of 400° F. and below.

To demonstrate the superior properties of carbon blacks subjected to this two-step process rather than to a process utilizing only a prolonged oxygen-type treatment to obtain the desired increase in volatile content, comparative data is presented below. Black A is a standard oxygen-treated black; Black B is a black subjected to the process of the instant invention.

TABLE I.—ANALYTICAL DATA

|  | Black A | Black B |
|---|---|---|
| Scale | 63.8 | 64.0 |
| Volatile | 12.8 | 12.6 |
| Surface area | 600.0 | 565.0 |

An air dry enamel formulation was prepared using 15 grams of the black being tested, 120 grams of a pure drying alkyd resin solution, sold under the trade designation Reichold P–470–70, and 10 grams of mineral spirits as the mill paste formulation prepared on a three-roll mill as is known to the art. Both blacks dispersed with about the same ease on the mill.

The following formulation was prepared utilizing the above mill paste:

| | Grams |
|---|---|
| Mill paste | 72.5 |
| Reichold P–470–70 | 165.0 |
| Mineral spirits | 45.0 |
| Cobalt naphthenate | 1.5 |
| Manganese naphthenate | 0.7 |
| Lead naphthenate | 3.8 |
| Anti-skimming agent | 0.5 |

When the air-dry enamel, the preparation of which is described above, was tested the following comparisons could be made between Black A and Black B:

Viscosity stability—Black B and Black A were substantially equivalent.

Jetness—The system prepared with Black B was better than the system prepared with Black A as determined by visual inspection.

Gloss—The system prepared with Black B had higher gloss than the system prepared with Black A.

Bluest Tone—Black A had a brown tone and was inferior to Black B which had a much bluer tone.

In nitrocellulose lacquer systems Black B was also found to have superior jetness and blueness in lacquers prepared from dough.

What is claimed is:

1. Process for improving the surface characteristics of high color channel blacks including their color tone, flow properties, gloss and jetness when used in liquid systems such as inks and paints which comprises subjecting such a black which already has a volatile content of from about 7 to about 13% by weight as a result of being oxidized by molecular oxygen to continuous treatment with vaporized concentrated nitric acid or nitric oxide vapors at a temperature between 400° F. and 600° F. for a period of about 30 to about 60 minutes, thereby effecting a substantial increase in volatile content of said black.

2. The process of claim 1 wherein the conditions are controlled so that the final volatile content of said black lies in the range of about 12 to about 18% by weight.

3. The process of claim 1 wherein the said continuous treatment at 400 to 600° F. is carried out while the black is being conveyed through an elongated conduit.

4. The process of claim 3 wherein the said elongated conduit is located within a channel black producing hot house so that the necessary temperatures are attained without an extraneous supply of heat.

References Cited

UNITED STATES PATENTS

| Re. 19,664 | 8/1935 | Damon | 23—209.9 |
| 2,420,810 | 5/1947 | Bray et al. | 23—209.1 |
| 3,226,244 | 12/1965 | Jordan et al. | 106—307 |
| 3,301,694 | 1/1967 | Kraus et al. | 106—307 |
| 3,336,148 | 8/1967 | Gunnell et al. | 23—209.1 X |
| 3,247,003 | 4/1966 | Pollock | 106—307 |

EDWARD J. MEROS, *Primary Examiner.*

U.S. Cl. X.R.

23—209.1